(12) United States Patent
Lubic et al.

(10) Patent No.: US 11,944,075 B2
(45) Date of Patent: *Apr. 2, 2024

(54) TOP-FILL HUMMINGBIRD FEEDER WITH FLOAT VALVE BASE CLOSURE MECHANISM HAVING A FOAM/FRAME FLOAT

(71) Applicant: Woodstream Corporation, Lancaster, PA (US)

(72) Inventors: Marko K. Lubic, Shillington, PA (US); Luke Benjamin Haney, Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,515

(22) Filed: Jun. 8, 2022

(65) Prior Publication Data

US 2022/0295758 A1    Sep. 22, 2022

Related U.S. Application Data

(63) Continuation of application No. 16/380,501, filed on Apr. 10, 2019, now Pat. No. 11,369,090.

(60) Provisional application No. 62/661,879, filed on Apr. 24, 2018.

(51) Int. Cl.
*A01K 39/026* (2006.01)
*A01K 39/02* (2006.01)
*A01K 39/04* (2006.01)

(52) U.S. Cl.
CPC ........ *A01K 39/026* (2013.01); *A01K 39/0206* (2013.01); *A01K 39/04* (2013.01)

(58) Field of Classification Search
CPC .. A01K 39/024; A01K 39/04; A01K 39/0206; A01K 39/026; F16K 33/00; F16K 31/18; F16K 31/20; F16K 31/22; F16K 31/24
See application file for complete search history.

(56) References Cited

U.S. PATENT DOCUMENTS

| 365,119 A | 6/1887 | Craig |
| 893,208 A | 7/1908 | Van Dyne |
| | (Continued) | |

OTHER PUBLICATIONS

Canadian Examination Report dated Nov. 27, 2023, corresponding to Application No. 3,040,411, 6 pages.

*Primary Examiner* — Peter M Poon
*Assistant Examiner* — Kari A Bradberry
(74) *Attorney, Agent, or Firm* — Barley Snyder

(57) ABSTRACT

A top-fill hummingbird feeder is provided having a nectar container with a liquid flow opening at a lower end and a removable cap at an upper end, a feeding basin positioned below the nectar container, and a sealing mechanism associated with the liquid flow opening and the feeding basin. The sealing mechanism includes a bottle seal assembly configured for removable coupling with a base of the feeding basin, and a float valve captured by said bottle seal assembly to prevent rotation thereof while allowing the float valve to move upwardly and downwardly with changing nectar levels in the feeding basin. The float valve includes a float having a frame with a buoyant member mounted thereon, the buoyant member being made of a closed-cell foam.

20 Claims, 7 Drawing Sheets

(56) References Cited

U.S. PATENT DOCUMENTS

| | | | | |
|---|---|---|---|---|
| 2,097,719 | A | * | 11/1937 | Brembeck ............ A01K 39/024 |
| | | | | 119/80 |
| 3,450,102 | A | * | 6/1969 | Franklin .............. A01K 39/024 |
| | | | | 137/430 |
| 3,450,103 | A | | 6/1969 | Davis |
| 3,505,975 | A | * | 4/1970 | Charles, Jr. ............ A01K 39/04 |
| | | | | 119/57.8 |
| 3,861,358 | A | * | 1/1975 | Bowell ................ A01K 39/024 |
| | | | | 119/79 |
| 4,180,015 | A | | 12/1979 | Dawson, Jr. |
| 6,685,518 | B1 | | 2/2004 | Goudey |
| 7,600,486 | B2 | | 10/2009 | Ellis |
| 8,863,692 | B2 | | 10/2014 | Colvin et al. |
| 8,869,743 | B2 | | 10/2014 | Cruz et al. |
| 11,369,090 | B2 | | 6/2022 | Lubic et al. |
| 2010/0224265 | A1 | * | 9/2010 | Kobayashi .............. F16K 31/22 |
| | | | | 137/202 |
| 2013/0092091 | A1 | * | 4/2013 | Gauker ................ A01K 39/024 |
| | | | | 119/80 |

\* cited by examiner

TOP-FILL HUMMINGBIRD FEEDER WITH FLOAT VALVE BASE CLOSURE MECHANISM HAVING A FOAM/FRAME FLOAT

CROSS-REFERENCE TO RELATED APPLICATIONS

This application is a continuation application of U.S. patent application Ser. No. 16/380,501, filed Apr. 10, 2019, which claims priority under 35 U.S.C. § 119 to U.S. Provisional Patent Application No. 62/661,879, filed Apr. 24, 2018, the entire disclosures of which are incorporated by reference herein.

FIELD OF THE INVENTION

The present invention is related to the field of bird feeders and, more particularly, to top-fill hummingbird feeders.

BACKGROUND

People who live in an area inhabited by hummingbirds frequently try to promote their presence by the use of hummingbird feeders. Since hummingbirds feed on nectar or simulated nectar, hummingbird feeders store a quantity of liquid nectar (or simulated nectar) in a reservoir from which the nectar is conveyed to a feeding basin with feed ports through which hummingbirds may access the nectar.

While hummingbird feeders have various configurations for controlling the flow of nectar into the feeding basin so that nectar does not overflow through the feed ports, one effective design is that of a float valve closure mechanism disclosed in U.S. Pat. No. 8,869,743 ("the '743 patent") which is co-owned by the assignee of the instant invention. The complete disclosure of the '743 patent is hereby incorporated by reference herein as if set forth in its entirety.

The float valve closure mechanism disclosed in the '743 patent includes a float made of molded plastic. A float having a lighter weight and greater buoyancy would allow for smaller feeder base and reservoir designs while maintaining good nectar flow control characteristics.

SUMMARY

The present invention is directed to a hummingbird feeder like that disclosed in the '743 patent which includes a generally upstanding reservoir bottle or nectar container having an open top end for receiving nectar to be held in the container, and a removable top or cap screw-threaded onto the top end to close the top end opening. The lower end of the nectar container has a bottom opening, preferably in the form of a bottleneck-shaped cylindrical extension with external threads that can be screw-threaded into an upstanding collar of a feeding basin. As in the '743 patent, the lower end of the bottleneck extension is provided with a seal plate having a central opening and a downwardly projecting nozzle positioned under the seal plate. The nozzle has a liquid flow channel that extends from the nozzle tip to the central opening in the seal plate.

The feeding basin is coupled below the nectar container and has a plurality of feeding ports in a known arrangement through which hummingbirds access nectar in the basin. A float valve is positioned in the well of the feeding basin and includes a generally cylindrical foam/frame float that acts to close the liquid flow channel in the nozzle when the feeding basin is filled with liquid nectar to the prescribed level. When the foam/frame float of the float valve is in a lower position, liquid flows from the container through the nozzle liquid flow channel and into the feeding basin. When the float rises to an upper position, a float seal on the foam/frame float engages the nozzle tip to seal off the liquid flow channel.

The foam/frame float includes a frame and a float. The frame resembles a wheel having a perimeter rim and an open central area. The open central area is bisected by a cross piece or bridge having a center piece that is joined to the rim on either end. The central area on either side of the bridge is open to accommodate the collar of the feeding basin, while the float seal is positioned in the center piece. The float is an annular foam member which is mounted on the frame rim like a tire on a wheel rim. The foam member causes the float to be lightweight and buoyant to float in the liquid nectar. The foam member is preferably formed of a closed cell foam that does not absorb fluid, such as hummingbird nectar.

In view of the foregoing, it is an object of the present invention to provide a reliable, consumer-friendly hummingbird feeder having a liquid-holding container or bottle with a large open top for easy top filling and cleaning of the container, and a float valve that includes a float having a buoyant member mounted on a supporting frame.

Another object of the present invention is to provide a hummingbird feeder in accordance with the preceding object in which the buoyant member includes at least one foam member fitted to a perimeter of the frame.

Yet another object of the present invention is to provide a hummingbird feeder in accordance with the preceding object in which the supporting frame of the float includes a generally annular rim with an open center spanned by a cross piece or bridge having a sealing member to close the liquid flow channel in the nozzle, the buoyant member including a foam ring that fits around the annular rim of the frame.

Still another object of the present invention is to provide a hummingbird feeder in accordance with the preceding objects in which the foam ring is made of a closed cell foam that does not absorb fluid.

A further object of the present invention is to provide a hummingbird feeder in accordance with the preceding objects in which the ring is made of a non-fluid absorbing foam such as closed-cell Ethyl Vinyl Acetate (EVA) type foam, expanded polystyrene foam, expanded polyethylene foam and the like.

A yet further object of the present invention is to provide a hummingbird feeder in accordance with the preceding objects in which the foam/frame float is lighter in weight and higher in buoyancy than molded plastic floats and therefore can be smaller in size while retaining good nectar flow control characteristics in use.

A still further object of the present invention is to provide a hummingbird feeder in accordance with the preceding objects in which the foam/frame float is easy to manufacture with the foam ring being pushed onto the rim of the frame with an interference fit.

Another object of the present invention is to provide a hummingbird feeder in accordance with at least one of the preceding objects in which the frame includes one or more flexible clip elements that engage with or are adjacent to a lower surface of the foam ring to further secure the foam ring against vertical movement relative to the frame.

Yet another object of the present invention is to provide a hummingbird feeder in accordance with the preceding objects having components that can be economically manufactured from readily available and known materials and that can be easily assembled and disassembled for easy cleaning while being sturdy and long lasting in operation and use.

These and other objects of the invention, as well as many of the intended advantages thereof, will become more readily apparent when reference is made to the following description taken in conjunction with the accompanying drawings.

DETAILED DESCRIPTION OF THE EMBODIMENTS

Figure 1:
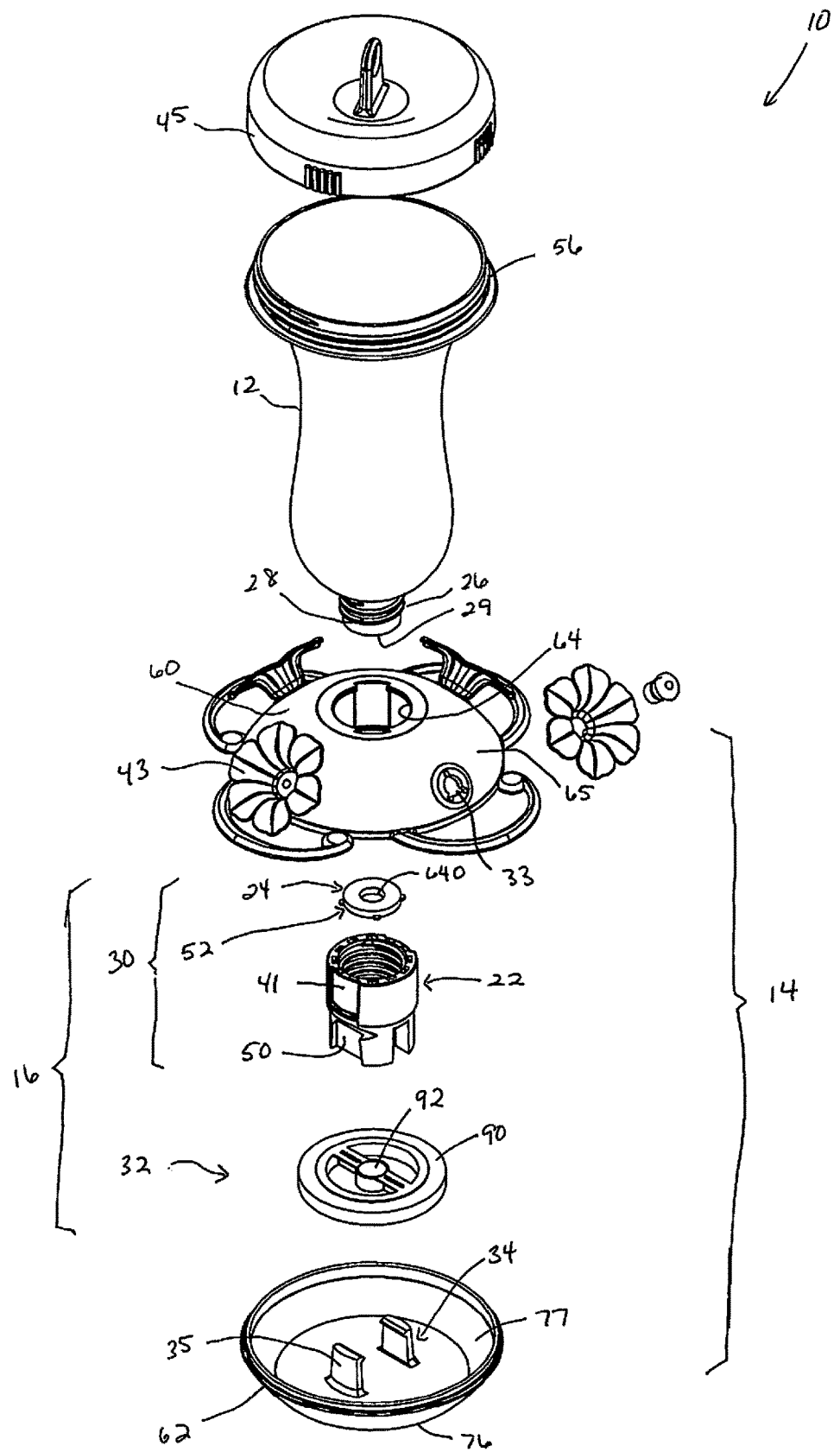
FIG. 1 is an exploded side view of the components of a top-fill hummingbird feeder with a foam/frame float valve in accordance with the present invention.

It is to be understood that the embodiment described herein is disclosed by way of illustration only. It is not intended that the invention be limited in its scope to the details of construction and arrangement of components set forth in the following description or illustrated in the drawings. Also, in describing a preferred embodiments, specific terminology will be resorted to for the sake of clarity. It is to be understood that each specific term includes all technical equivalents which operate in a similar manner to accomplish a similar purpose.

A float valve style hummingbird feeder in accordance with the present invention is shown in FIG. 1 and is generally designated by reference numeral 10. The feeder 10 includes a nectar container generally designated by reference numeral 12, a feeding basin generally designated by reference numeral 14, and a sealing mechanism generally designated by reference numeral 16. The bottom of the nectar container 12 forms a generally cylindrical bottleneck-shaped extension 26 with external threads 28 and a lower edge 29. The sealing mechanism 16 includes a bottle seal assembly, generally designated by reference numeral 30, and a float valve, generally designated by reference numeral 32, that is configured for engagement with the bottle seal assembly 30. A removable top or cap 45 closes off the large opening 56 at the upper end of the nectar container 12 and is vented to prevent a vacuum condition in the nectar container.

The feeding basin 14 includes a base 62 and a removable cover 60. The base has a bottom 76 and an upwardly directed outer wall 77. The cover 60 is preferably dome-shaped, with a central opening 64 at the upper end of the dome and a downwardly directed outer wall 65 having a plurality of feed ports 33 fitted with artificial flower assemblies 43. The lower edge of the cover outer wall 65 is configured to form a sealing connection with the upper edge of the base outer wall 77 when the basin is assembled. The central opening 64 in the cover 60 receives the bottleneck extension 26 and the bottom 76 of the base 62 is provided with a guide structure generally designated by reference numeral 34, the guide structure having two guide panels 35 that are operative with the bottle seal assembly 30. The guide structure 34 is discussed more fully in the '743 patent previously incorporated by reference herein.

The bottle seal assembly 30 includes a bottle collar generally designated by reference numeral 22, a bottle seal generally designated by reference numeral 24, and a nozzle member generally designated by reference numeral 52. The bottle collar 22 includes two upper alignment recesses 41 on opposing sides thereof and two lower alignment recesses 50. At the base of each upper alignment recess 41 is a coupling element that engages with coupling elements on the cover 60 to secure the cover to the bottle collar 22 when the feeder is assembled. Detail on these coupling elements is provided in the '743 patent but, not being directly germane to the invention to which the instant application pertains, is not repeated herein.

Figure 4:
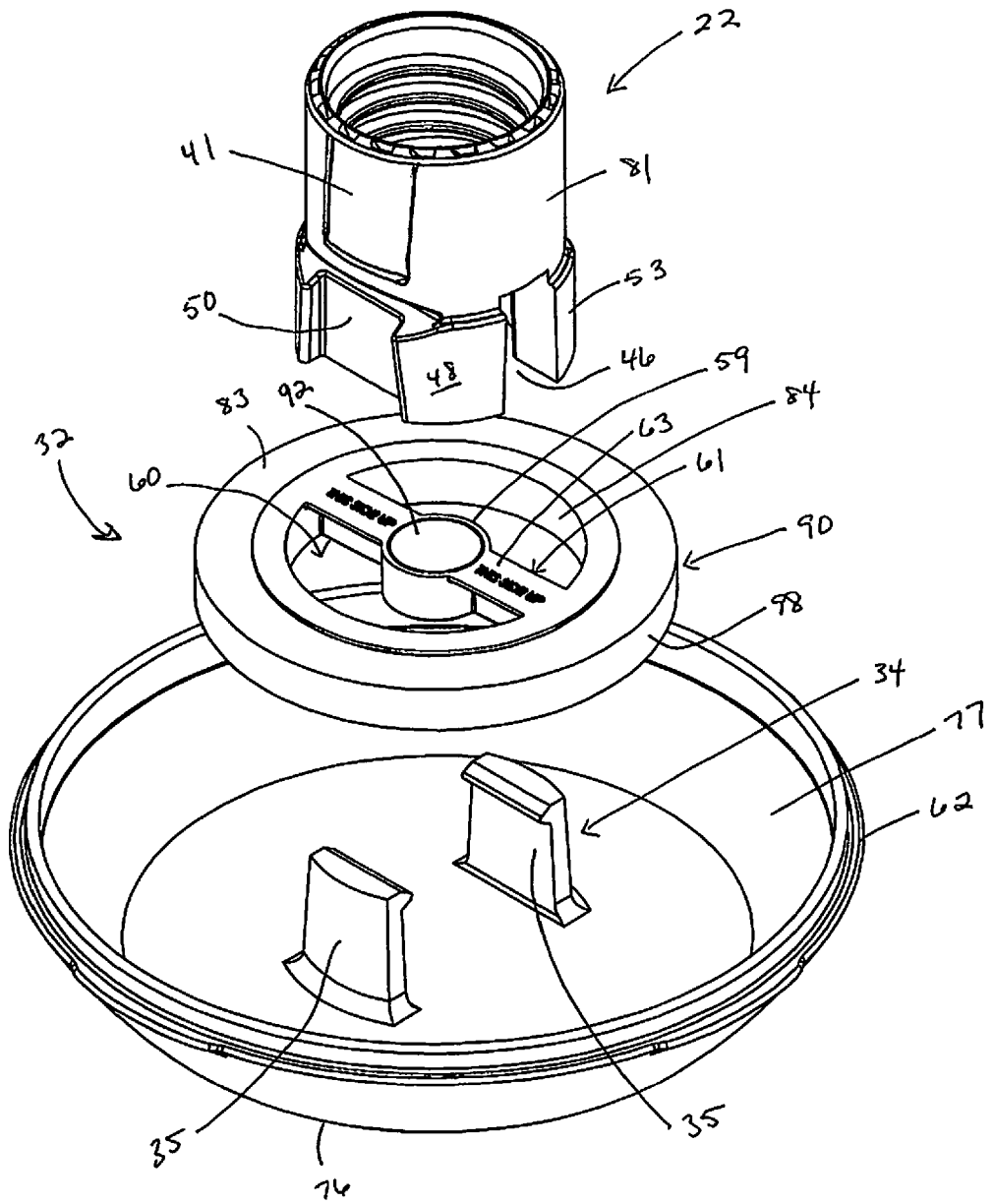
FIG. 4 is an exploded perspective view of the bottle seal assembly, float valve and feeding basin base of the feeder shown in FIG. 1.

The bottle collar 22 has an upper part 81 and a lower part 53 (see FIG. 4). The lower part 53 of the bottle collar has a slot 46 formed therein that passes through opposing sides of the lower part wall 48. The lower alignment recesses 50 are arranged on opposing sides of the lower part 53 of the bottle collar 22. Preferably, the lower alignment recesses 50 are in generally vertical alignment with the upper recesses 41 in the upper part 81, and the opposing sides of the lower part 53 having the lower alignment recesses 50 are substantially orthogonal to the opposing sides that are slotted at 46.

Figure 7:
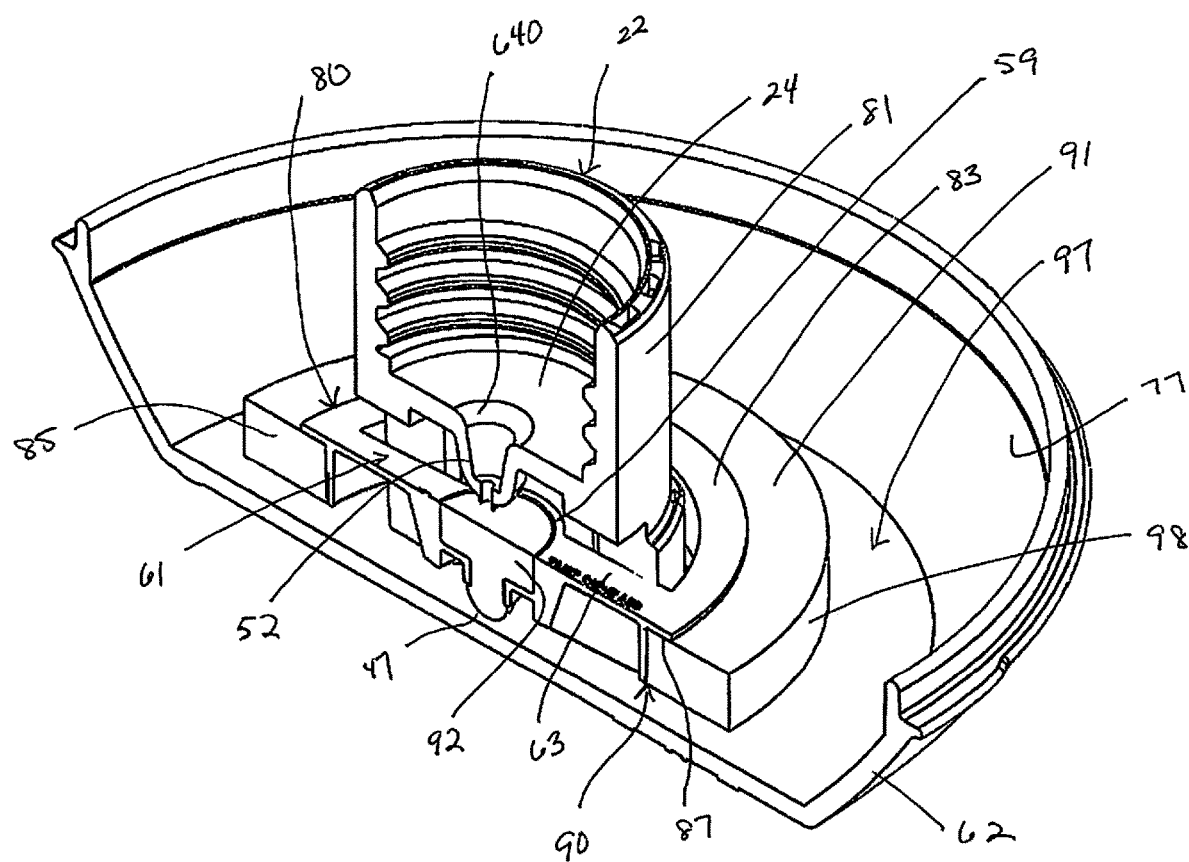
FIG. 7 is a sectional perspective view of the bottle seal assembly, float valve and feeding basin base shown in FIG. 5.

The bottle seal 24 may be configured as a flat ring with a central opening 640, similar to a washer or gasket, and may be made of cork or other compressible material capable of forming a liquid seal when brought into abutment with the lower edge of the bottleneck extension 26, with the nozzle member 52 being positioned below the bottle seal 24 (see FIG. 7).

Figure 2:
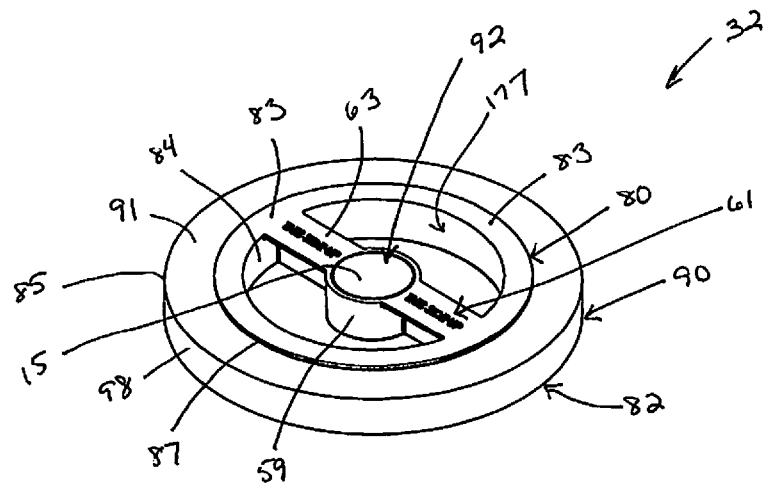
FIG. 2 is a perspective view of the foam/frame float component of the top-fill hummingbird feeder shown in FIG. 1.
Figure 3:
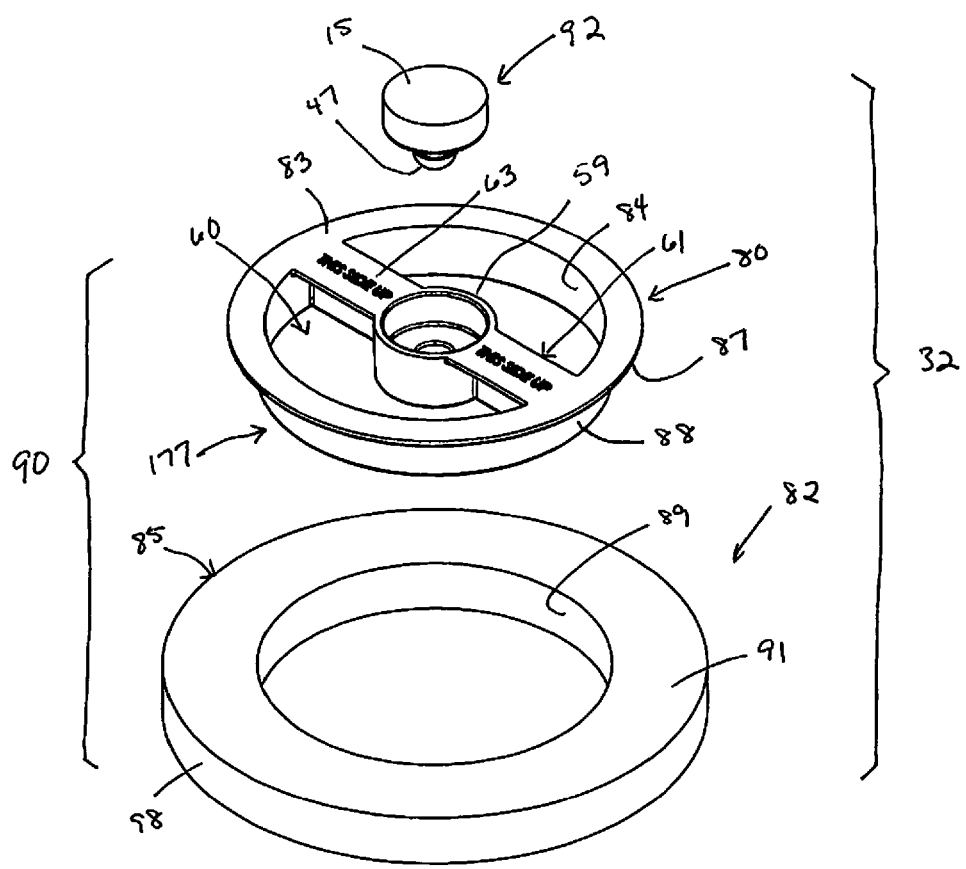
FIG. 3 is an exploded view of the foam/frame float shown in FIG. 2.

As shown in isolation in FIGS. 2 and 3, the float valve 32 includes a foam/frame float generally designated by reference numeral 90 and a float seal generally designated by reference numeral 92. The float 90 includes a frame generally designated by reference numeral 80 and a buoyant member generally designated by reference numeral 82.

In the embodiment shown, the frame 80 is a molded plastic member having a generally flat upper surface 83 and a downwardly depending wall generally designated by reference numeral 177. The wall 177 is inset from the outer edge of the upper surface 83 to form a lip 87. The inner side 84 of the wall 177 defines a central area, generally designated by reference numeral 60, of the frame. The central area 60 is preferably cylindrical although other shapes could be used provided the central area is able to accommodate the basin collar 22. The outer side of the frame wall 177 defines a rim 88.

Extending across the central area 60 is a cross piece or bridge, generally designated by reference numeral 61, that substantially bisects the central area 60. The bridge 61 has two arms 63 in linear alignment with one another. The arms 63 extend inwardly into the central area 60 and are joined by a center piece 59. The float seal 92 is inset within or otherwise secured to the center piece 59. As shown in FIG.

3, the center piece 59 may have a hollow area into which the float seal 92 is inserted. In the embodiment shown, the float seal 92 is provided with an elastomeric rounded or bulbous tip 47 that, when pushed, is compressed to pass through a reduced diameter opening in the bottom of the center piece 59 and then elastically rebounds to lock the seal in place once seated. Alternatively, the float seal could be secured to the frame using other means, such as by overmolding of the seal onto the float frame, pressing the seal into a recess in the center piece with an interference fit, and the like. However it is seated, the float seal 92 is preferably inset within the center piece 59 so that an upper surface 15 of the float seal is flush with the upper rim of the center piece 59. Alternatively, the float seal may project upwardly from the center piece or be recessed therein so that the upper surface of the float seal is higher or lower than the upper rim of the center piece, respectively.

The float seal 92 is positioned in the center piece 59 so as to be directly below the tip of the nozzle 52 when the feeder is assembled (see FIGS. 6 and 7). The float seal 92 is preferably made of any soft elastomer, silicone, rubber or other flexible sealing material. The nozzle 52 is made of a less flexible material than the float seal 92 to ensure that the nozzle will seat itself in the float seal to close the channel in the nozzle member 52 when the foam/frame float 90 is in the upper position.

Figure 6:
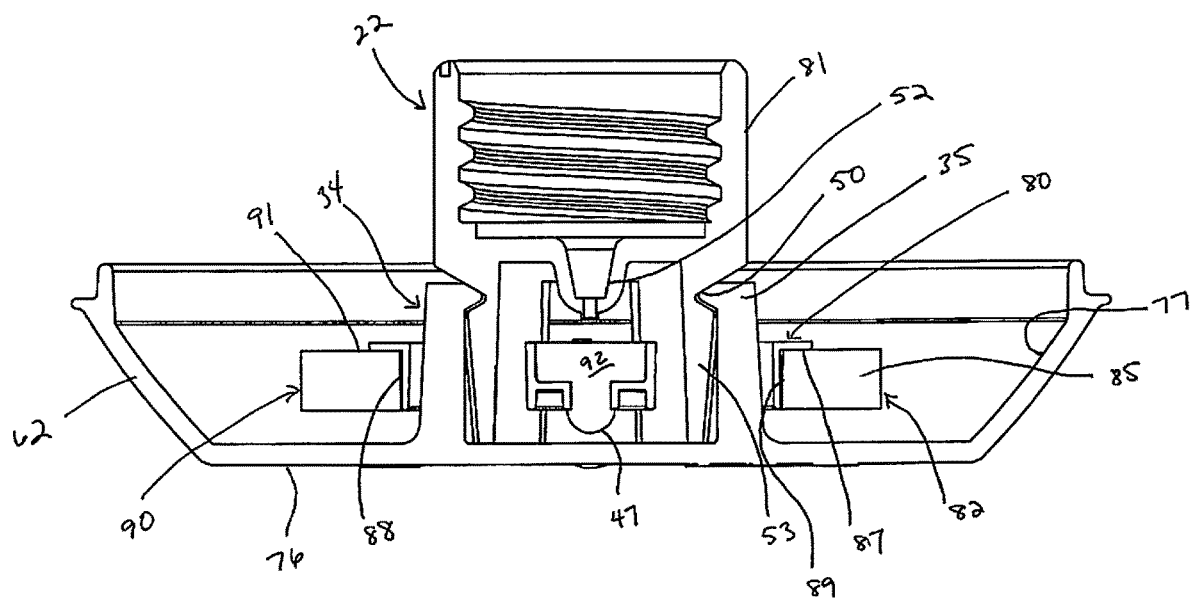
FIG. 6 is a cutaway view of the assembled bottle seal assembly, float valve and feeding basin base shown in FIG. 5.

The buoyant member 82 of the foam/frame float 90 is preferably an annular foam ring 85 having an inner surface 89 that engages with the frame rim 88 when the ring is mounted on the frame 80 while at least part of the upper surface 91 of the ring is captured under the lip 87 (see FIG. 6). The ring 85 is made of a material that will float in water and/or nectar so that, as the nectar level in the feeding basin rises, the float 90 moves to an upper position and when the nectar level drops, the float moves to a lower position (see FIG. 6). Accordingly, the buoyant member 82 may be shaped in any number of configurations provided the material from which the member 82 is made is sufficiently buoyant so that the foam/frame float 90 moves up and down with corresponding changes in the nectar level.

To provide the desired buoyancy, the buoyant member is preferably made of a closed-cell Ethyl Vinyl Acetate (EVA) type foam which is not capable of fluid absorption. Other closed-cell foams may also be used such as expanded polystyrene foam, expanded polyethylene foam, and the like. A foam ring 85 made of one of these types of foam is lighter in weight and has a higher buoyancy than floats made of molded plastic. As a result, the foam/frame float can be smaller in size to accommodate a wider range of feeder designs while retaining effective nectar flow control characteristics. Further, since the foam ring may be simply pushed together with the frame to have an interference fit, the foam/frame float is easier and less expensive to manufacture than plastic floats which typically include two halves that are ultrasonically welded to one another.

Figure 8:
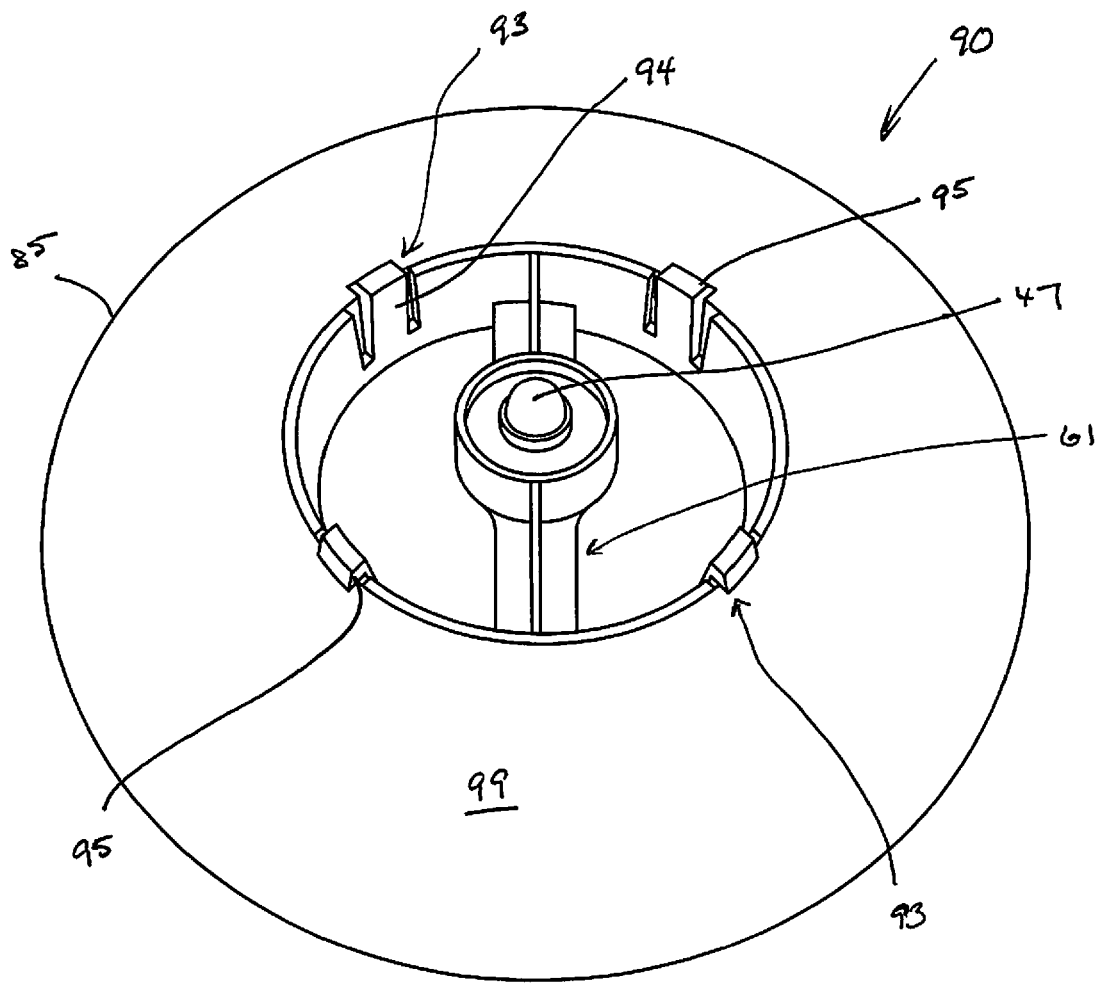
FIG. 8 is a lower perspective view of a foam/frame float component like that shown in FIG. 2, in which the frame includes a plurality of clip elements to further secure the foam ring in place on the frame.

To further secure the foam ring in the desired position on the frame, the frame may be configured to include one or more clip elements, generally designated by reference numeral 93, as shown in FIG. 8. The clip elements 93 include a flexible arm 94 with a hooked end 95 that engages with or is adjacent to the lower surface 99 of the foam ring 85. The arm 94 of the clip element 93 may thus be flexed radially inwardly and then released to allow the hooked end 95 to snap into place and prevent the foam ring from sliding downwardly on the frame. The particular clip configuration shown is representative as other clip or snap structures that perform the same function are also understood to be included within the scope of the present invention. It will also be understood that the clip elements may be used alone to secure the foam ring on the frame or may be used in combination with a friction fit between the foam ring and the rim of the frame.

While a preferred embodiment of the foam/frame float as shown herein includes a frame surrounded by an annular foam ring, the foam/frame float could have multiple configurations. For example, the buoyant member may include a plurality of foam members affixed to or otherwise mounted on the frame, such as by an interference fit. For example, the frame could be configured to include a plurality of outwardly directed arms with each arm having a foam member secured thereon, or the frame could include cutouts into which foam members are inserted. Therefore, the present invention is intended to include any combination of a frame and at least one buoyant member mounted to the frame, the buoyant member preferably being mounted on the perimeter of the frame or on an outer edge part of the frame or on an outwardly extending part of the frame, according to the shape of the frame.

Figure 5:
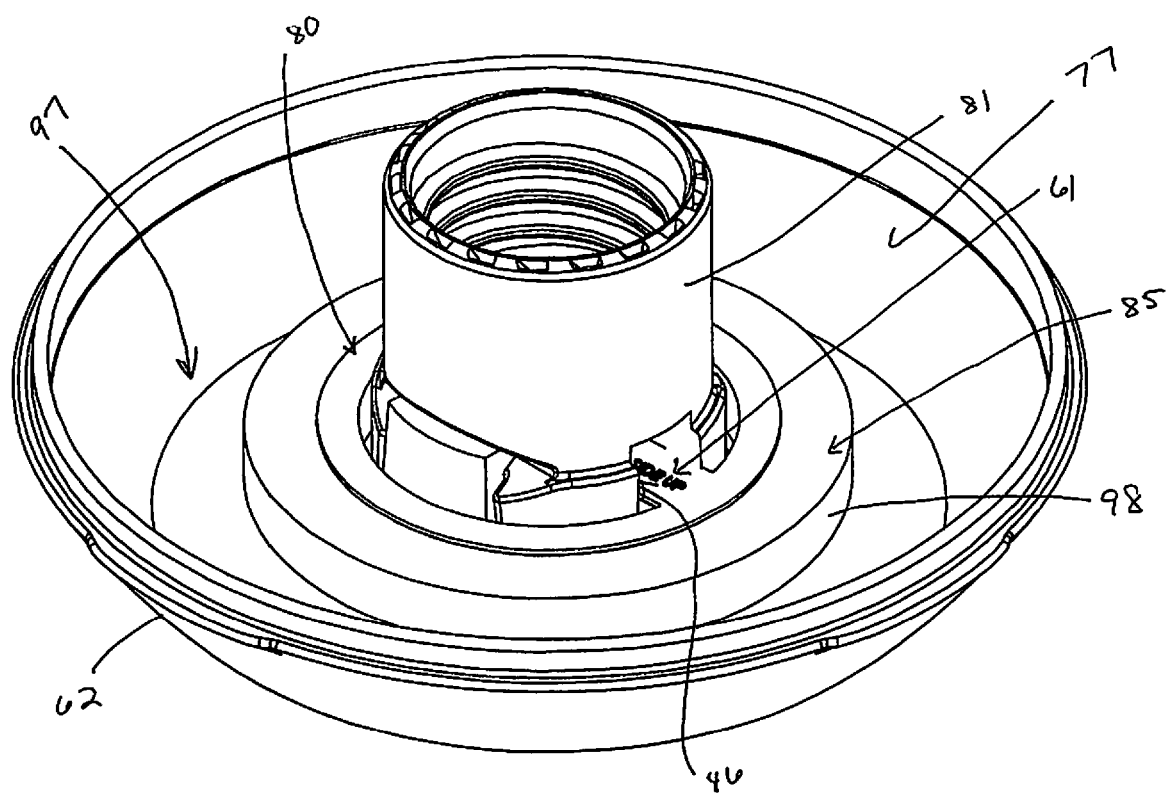
FIG. 5 is an assembled view of the components shown in FIG. 4.

To assemble the float portion of the feeder 10, the float valve 32 is positioned within the feeding basin 14 with the outer perimeter wall 98 of the ring 85 facing the inner surface of the base outer wall 77, the inner side 84 of the wall 177 surrounding the guide structure 34, and the bridge 61 extending between the guide panels 35 as shown in FIGS. 5 and 6. Due to the buoyancy of the ring 85, the float 90 can be smaller than the molded plastic float design shown in the '743 patent, leaving a wider open annular area, generally designated by reference numeral 97, between the outer perimeter wall 98 and the inner surface of the wall 77. This open annular area 97 ensures hummingbirds have unobstructed access to the nectar held in the basin when they insert their beaks through the feed ports 33.

With the float in place, the bottle seal assembly is then received within the basin by aligning the slot 46 in the bottle collar lower part 53 with the arms 63 of the bridge in the central area of the float, and engaging the lower alignment recesses 50 with the guide panels 35 of the guide structure 34 as shown in FIGS. 5 and 6. The positioning of the bridge 61 within the slot 46 in the bottle collar 22 captures the float valve 32 to prevent the float from rotating. The float valve 32 is free, however, to move up and down with the nectar level. A cutaway perspective view of the assembled float portion of the feeder is shown in FIG. 7.

Before the feeder is filled with nectar, or when the nectar level is low, the lower surface of the ring 85 rests on, or is near, the bottom of the feeding basin base 62 (see FIG. 6). In this lower position, the tip of the nozzle 52 of the bottle seal assembly 30 is spaced from the float seal 92, allowing nectar, when poured into the container, to flow into the feeding basin. As nectar flows into the feeding basin, the level of the nectar and, in turn, the vertical position of the foam/frame float, rises. When sufficient nectar has been received within the basin, the float valve 32, floating in the nectar, reaches its upper position at which point the feeding basin is "full".

In the "full" position, the float seal 92 comes into sealing engagement with the tip of the nozzle 52. With the nozzle tip seated in the float seal, the float seal closes or plugs the central channel in the nozzle 52 to prevent further flow of nectar into the feeding basin through the central channel, thus allowing the remainder of the container to be filled as desired. Thereafter, the container can be topped off and/or refilled at any time, as needed, by opening the top thereof and adding additional liquid. The upward pressure of the float valve 32 against the tip of the nozzle 52 once the basin is full keeps too much liquid nectar from entering the basin and overflowing therefrom.

As the feeder is thereafter used by feeding birds, the level of nectar in the basin will drop. Since the float valve 32 rises and falls with the nectar level, the lowering of the nectar creates a space between the tip of the nozzle 52 and the float seal 92, once again allowing liquid to flow from the container 12 into the basin 14 through the central channel in the nozzle until the basin is again filled, at which time the accompanying rise in the float closes the nozzle channel with the float seal. In this way, the feeder basin is continually refilled by the quantity of liquid in the container.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A top-fill hummingbird feeder comprising:
a nectar container with a liquid flow opening at a lower end and a removable cap at an upper end;
a feeding basin positioned below the nectar container for containing nectar accessed by birds through at least one feeding port; and
a sealing mechanism associated with the liquid flow opening of the nectar container and the feeding basin, the sealing mechanism including a float valve having:
a frame including an annular ring having a rim and defining an open central area spanned by a bridge; and
a buoyant member including an annular ring mounted against the rim, the annular ring of the buoyant member defining a central opening receiving the rim, wherein, when the float valve is in a first position, the float valve opens the liquid flow opening allowing fluid to flow from the container into the feeding basin and, when the float valve is in a second position, the float valve closes the liquid flow opening to prevent fluid flow from the nectar container into the feeding basin.

2. The top-fill hummingbird feeder as set forth in claim 1, wherein the annular ring of the buoyant member is pressed onto the rim of the frame with an interference fit.

3. The top-fill hummingbird feeder as set forth in claim 1, wherein the frame further includes at least one clip element that engages with a lower surface of the annular ring of the buoyant member.

4. The top-fill hummingbird feeder as set forth in claim 1, wherein the annular ring of the buoyant member is made of at least one of a closed-cell foam, Ethyl Vinyl Acetate (EVA) foam, expanded polystyrene foam or expanded polyethylene foam.

5. The top-fill hummingbird feeder as set forth in claim 1, wherein the buoyant member is discrete and removable from the frame.

6. The top-fill hummingbird feeder as set forth in claim 1, wherein the annular ring of the buoyant member is secured on the frame with at least one clip element formed integrally with the rim of the frame.

7. The top-fill hummingbird feeder as set forth in claim 5, wherein the sealing mechanism further comprises a float seal discrete from the buoyant member and the frame and removably arranged within a first opening defined in the bridge of the frame, the float seal engaging with the liquid flow opening in the second position of the float valve.

8. The top-fill hummingbird feeder as set forth in claim 7, wherein a top surface of the float seal is oriented flush with a top surface of the bridge of the frame.

9. The top-fill hummingbird feeder as set forth in claim 7, wherein a bottom of the float seal defines an elastic tip having a diameter greater than a diameter of a second opening formed in a bottom side of the bridge and within the first opening.

10. The top-fill hummingbird feeder as set forth in claim 9, wherein the elastic tip of the float seal is inserted through the second opening of the bridge.

11. A top-fill hummingbird feeder, comprising:
a nectar container with a liquid flow opening at a lower end and a removable cap at an upper end;
a feeding basin positioned below the nectar container for containing nectar accessed by birds through at least one feeding port; and
a sealing mechanism associated with the liquid flow opening of the nectar container and the feeding basin, the sealing mechanism including a float valve having a frame and a buoyant member discrete from the frame, and which, when the float valve is in a first position, opens the liquid flow opening allowing fluid to flow from the container into the nectar basin and, when the float valve is in a second position, closes the liquid flow opening to prevent fluid flow from the container into the nectar basin, the frame of the float valve including an annular ring having a generally flat upper surface and a downwardly depending wall that forms a rim, the outer perimeter of the upper surface forming a generally horizontal lip, and the buoyant member including an annular ring mounted against the rim, at least part of an upper surface of the annular ring of the buoyant member being captured by and under the lip.

12. The top-fill hummingbird feeder as set forth in claim 11, wherein the annular ring of the buoyant member is pressed onto the rim of the frame with an interference fit.

13. The top-fill hummingbird feeder as set forth in claim 11, wherein the annular ring of the buoyant member is made of a closed-cell foam that does not absorb fluid.

14. The top-fill hummingbird feeder as set forth in claim 11, wherein the frame further includes at least one clip element that engages with a lower surface of the annular ring of the buoyant member.

15. The top-fill hummingbird feeder as set forth in claim 14, wherein the frame is received within a central opening of the buoyant member, at least part of the upper surface of the annular ring of the buoyant member abutting a lower surface of the lip continuously about its circumference for capturing the buoyant member.

16. The top-fill hummingbird feeder as set forth in claim 15, wherein the at least one clip is defined on the rim and includes a free end engaging with the lower surface of the annular ring of the buoyant member.

17. The top-fill hummingbird feeder as set forth in claim 16, wherein the at least one clip includes a downwardly extending arm and a hook formed on a free end thereof, the downwardly extending arm abutting a radially inward facing side of the annular ring of the buoyant member and the hook engaging with the lower surface of the annular ring of the buoyant member.

18. The top-fill hummingbird feeder as set forth in claim 11, wherein the sealing mechanism further comprises a float seal arranged within an opening defined in a bridge of the frame, the float seal engaging with the liquid flow opening in the second position of the float valve.

19. A top-fill hummingbird feeder, comprising:
a nectar container having a liquid flow opening at a lower end;
a feeding basin positioned below the nectar container for containing nectar accessed by birds through at least one feeding port; and
a sealing mechanism associated with the liquid flow opening of the nectar container and the feeding basin, the sealing mechanism having a float valve including:
a frame formed as an annular ring having a downwardly extending rim defining an open central area spanned by a bridge, and a flat upper surface extending radially outward from a top of the rim defining a lip;
a float seal removably received within an opening defined in the bridge of the frame for engaging with the liquid flow opening of the nectar container; and
a buoyant member formed as an annular ring and discrete from the frame and the float seal, the rim of the frame removably received through a central opening of the buoyant member such that an upper side of the annular ring of the buoyant member is captured by the lip and contacts an underside of the lip continuously about its circumference, wherein in a first position the float valve opens the liquid flow opening allowing fluid to flow from the container into the basin, and in a second position the float valve closes the liquid flow opening to prevent fluid flow from the container into the basin.

20. The top-fill hummingbird feeder as set forth in claim 19, wherein the frame further defines a flexible clip formed on the rim and including a downwardly extending arm and a hook formed on a free end thereof, the downwardly extending arm abutting a radially inward facing side of the buoyant member and the hook engaging with a lower surface of the annular ring of the buoyant member.

* * * * *